United States Patent Office 3,311,041
Patented Mar. 28, 1967

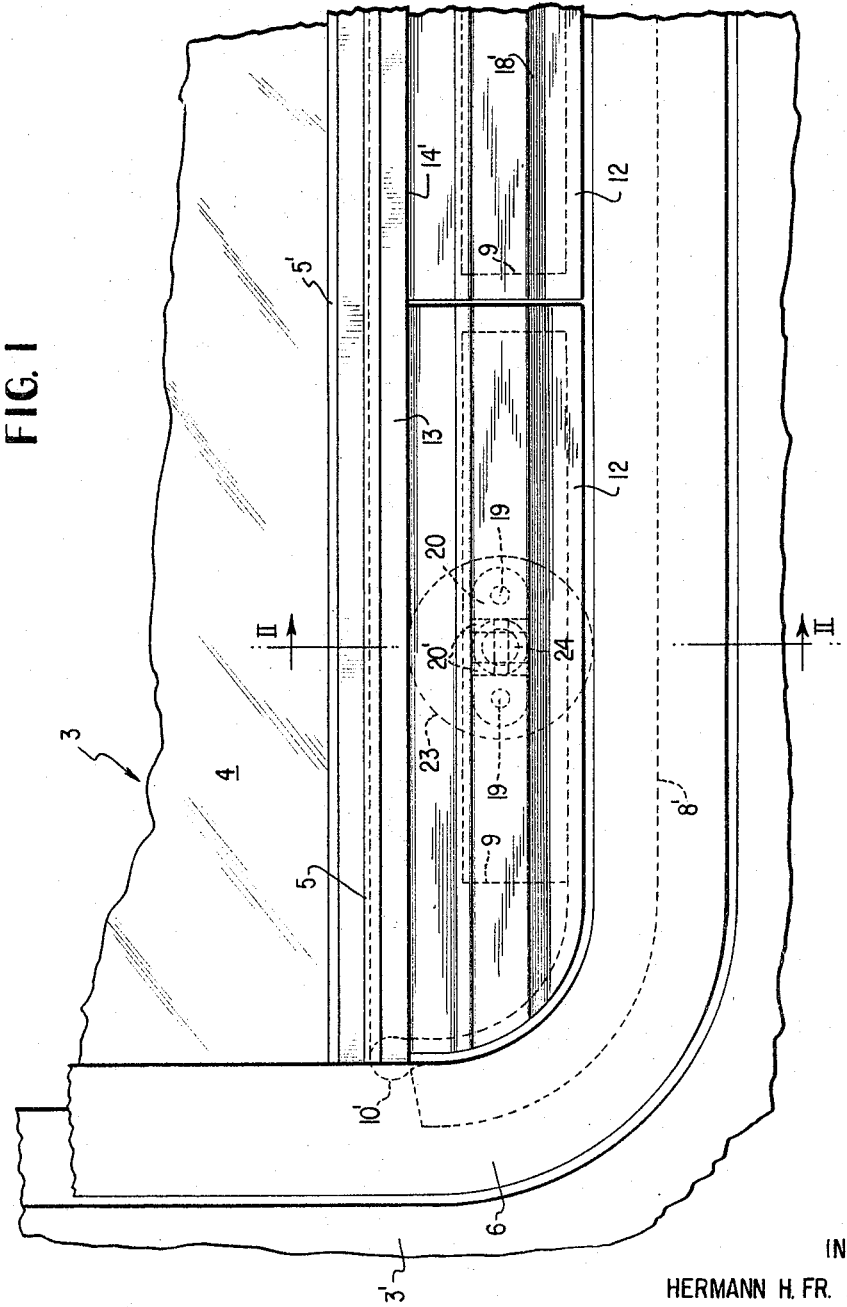

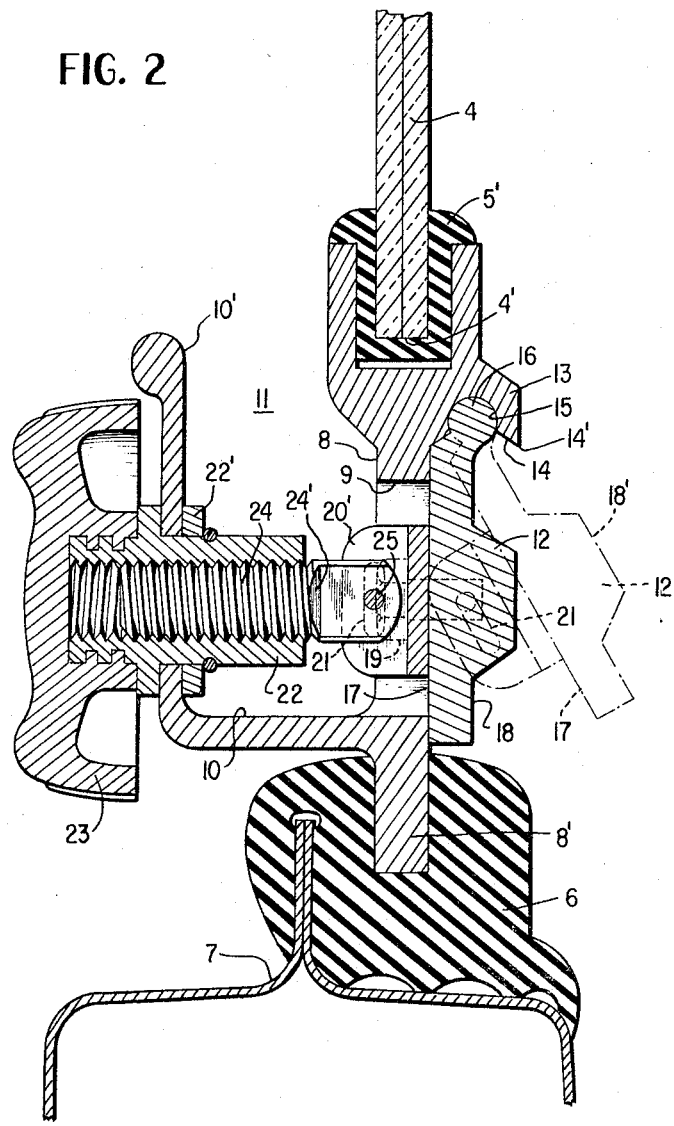

3,311,041
VENTILATING ARRANGEMENT FOR MULTI-PASSENGER VEHICLES
Hermann H. Fr. Ahrens, Stuttgart-Vaihingen, Germany, assignor to Daimler-Benz Aktiengesellschaft, Stuttgart-Unterturkheim, Germany
Filed Mar. 26, 1965, Ser. No. 442,973
7 Claims. (Cl. 98—2)

The invention relates generally to a ventilating arrangement for vehicles, and particularly buses, in the form of air openings which preferably are arranged at the lower part of the vehicle window and are adjustable from the inside of the vehicle by means of pivotable air lids.

The large number of passengers accommodated in the relatively small enclosure, for example, of a bus, requires, for maintaining the comfort of the passengers, an individual supply of fresh air corresponding to the individual constantly changing requirements of each passenger and preferably this supply of fresh air should be provided at a favorable elevation with respect to the passenger to insure maximum comfort and most efficient ventilation.

A direct exposure to air, that is, a direct supply of fresh air, is sensed as preferably comfortable by a passenger of average body height when the air supply is directed somewhat below his shoulders when in a sitting position, because the air taken from the outside at this elevation is usually free of harmful components and unpleasant odors, and in relation to the air inside the vehicle has a higher oxygen content and mostly a lower temperature.

A known solution to this ventilation problem in multi-passenger vehicles provides an air passage in the area of the upper edges of the vehicle side windows to allow outside air to enter the vehicle; this construction results in undue restrictions on the window design and is constructively impossible with severely curved windows, such as those which curve over and extend into the roof line of the vehicle to provide increased viewing.

Another solution includes the arrangement of sealing means which are at least partially movable in relation to the window frame and other body support structure and are removably arranged from the lower edge of the window. Such an arrangement is limited to frameless windows which are not fastened downwardly, and requires special devices for removing the sealing means from the window. Furthermore, removal is continuous over the entire width of the window so that for ventilation of a window position at the end of the resulting slot, air enters also at the beginning of the slot, which is often undesirable.

And finally, a ventilating arrangement at the windshield of the vehicle is known which is provided with openings along the passenger compartment covered by a stationary or movable shutter. On the inside, a further lid is provided which can, itself, be shifted parallel to the vehicle body to selectively admit air. This application is very complicated in its construction and is not suitable for a positive ventilation as a result of the air stream issuing all around.

The present invention provides each passenger of the vehicle, in addition to the usual devices for ventilating the vehicle inside, with a direct source of fresh air which is taken from a relatively clean zone of outside air. This is accomplished according to the invention by providing between the edge of the window and the vehicle wall a portable insert member extending over the entire length of the window. This insert member seals itself on the one hand to the window and on the other hand to the vehicle wall and is provided with at least one air opening that can be selectively closed.

More specifically, the invention provides a construction in which an especially constructed air opening is positioned adjacent to each vehicle seat within the associated window, and which may be rectangular in shape or any other configuration which permits the free flow of air. With this arrangement, each opening is itself capable of being uncovered or adjusted with an individual pivotable lid.

With the invention, the disadvantages mentioned above are avoided. Each passenger may adjust his or her assigned ventilating lid without being exposed to a bothersome draft and without annoying the other passengers with unwanted ventilation or the lack thereof. The invention is especially suitable for the side windows because a corresponding overpressure exists at the outside of the vehicle along the sides thereof which materially aids the passage of air into the vehicle interior.

According to an advantageous continuation of the basic inventive idea, the portable insert member at the inside of the vehicle is provided with an angularly bent extension which supports an adjusting mechanism for the pivotable lid and which may serve as a continuously extending trench for collecting condensation from the vehicle windows. Thereby, with the portable insert member serving for the ventilation, the problem of window condensation is solved simultaneously.

In accordance with the invention, a spindle drive for the adjusting mechanism for the lid is arranged in the angularly bent extension. The lid should preferably open outwardly; however, principally an opening inwardly is not excluded. As a means of hinging the lid, there is provided at its edges a bead completely traversing one edge thereof, or a number of sectionalized beads, which beads communicate in a hinge-like, swingable manner with a cut-out on the underside of a projection on the insert member providing a bead and socket arrangement for pivoting the lid.

Accordingly, it is an object of the present invention to provide a vehicle ventilating arrangement of the type described hereinabove which avoids in a simple and operationally reliable manner the disadvantages encountered with known prior art constructions.

Another object of the invention resides in the provision of a portable ventilation member capable of insertion in a vehicle window to provide a selectively adjustable source of outside air at each window.

Still another object of the invention resides in the provision of a portable ventilation member of the type described hereinabove which additionally provides means for collecting and disposing of window condensation from the vehicle windows.

A further object of the invention resides in the provision of a ventilating structure for a vehicle window which makes possible individual adjustment of the ventilation provided at each window without materially altering the ventilation characteristics in areas adjacent other windows of the vehicle.

Still a further object of the invention resides in the provision of a ventilating structure which may be easily inserted and removed from a vehicle window without requiring special constructions of either the window or the window frame.

Another object of the invention resides in the provision of a ventilating structure in which specially constructed air openings are positioned adjacent each vehicle seat and are provided with closure members hinged to the ventilating structure in an especially simple manner so as to materially facilitate the adjustment thereof.

A still further object of the invention resides in the provision of a ventilating structure in which the individual parts may not only be manufacured in a simple and relatively inexpensve manner, but which also enables interchangeability of the parts from one unit to another.

Still another object of the invention resides in the provision of a ventilating structure which provides for selective regulation of the ventilating characteristics at substantially each passenger position while deriving said ventilation from an area of high pressure at the exterior surface of the vehicle.

These and other objects, features and advantages of the present invention will become more obvious from the following description when taken in connection with the accompanying drawings which shows, for purposes of illustration only, several embodiments in accordance with the present invention, and wherein FIGURE 1 shows a plan view of the exterior side of a vehicle window portion of a motor vehicle embodying the invention; and FIGURE 2 shows a cross section along line I—I of FIGURE 1.

Referring now to the drawings wherein like reference numerals are used throughout the various views to designate like parts, the side windows 3 of a bus are each provided with a relatively broad and high window glass 4. Each window glass 4 is supported in position at the bottom thereof by a solid inert member 5 which itself is inserted at the bottom and lateral sides into the sealing profile 6 on the window sill 7 and window posts 3' of the vehicle wall, respectively. The insert member 5 is, as seen in FIGURE 2, formed at its upper edge with a U-shaped cross section which receives thereby the lower edge 4' of the window 4 over the entire width thereof by means of a resilient rim or strip sealing member 5'. The lower edge 8' and the lateral edges of the insert member 5 have approximately the same strength and dimensions as the window 4 so that the normal window seal 6 may be utilized. By use of the sealing member 5' and the normal window seal 6, separate assembly of the inventive device is possible, making the device portable in the manner of an accessory.

The insert member 5 is provided for each passenger position with an opening 9 aligned with the adjacent seats and formed in a straight shank portion 8 of the insert member 5, so that each seat is assigned one opening, which may have a rectangular shape or any other configuration which permits the free flow of air. Starting at the lower edge of opening 9 in the shank portion 8 of the insert member 5, there is provided an extension 10 protruding into the vehicle and bent upwardly at its free end 10' so as to form with the shank portion 8 thereof a continuous upwardly facing open channel 11. The free end 10' of the extension 10 extends upwardly to approximately the height of the lower edge of the window 4' and is toroidally shaped at its extreme end, which may be covered with a soft over-lay to prevent accidental injury to the passenger. Close to the window post 3', the extension 10 is bent inwardly until it contacts the post and the trench bottom is raised up to approximately the height of the lower side of the window.

Inflow of fresh air takes place from the outside through openings 9 and is directed upwardly as a result of extension 10 to the passenger sitting close to or adjacent the opening. Furthermore, condensation dripping from the window may be collected in the channel 11 and may drain through opening 9 to the outside. For this reason, the channel bottom is in alignment with the lower edge of opening 9 and may also be provided with a more or lesser inclination toward the outside of the vehicle.

In order to be able to adjust the quantity of inflowing fresh air, each opening 9 is provided with a pivotable flap or lid 12 which serves as a closure member for the opening. Lid 12 is rotatably arranged on the insert member 5 by means of a projection 13 extending outwardly from the insert member above the upper edge of opening 9. At the underside 14 of this projection 13, there is provided an almost entirely circularly shaped recess 15 which serves as a bearing for the cylindrically shaped bead 16 of lid 12. Projection 13 with its recess 15 may extend over the entire width of the pivotable lid or may even extend over the entire width of the window. At the same time, the cylindrically shaped bead 16 of the lid may also extend over the entire width of the window. Assembly of the lid and insert member may, through use of sufficiently resilient material for the insert member 5, be accomplished by simple forcing. Another possibility lies therein, that the bead 16 is formed in such a manner, for example, flattened, that the lid in its extreme position—which later in operation cannot be attained—may be inserted into recess 15. If both are not possible or are undesirable, projection, recess, and bead may be constructed in sections shifted in relation to each other so that lateral insertion is made possible.

The lid 12 closes the openings 9 completely with its inner flat surface 17 and is chamfered on top corresponding to the underside 14 of projection 13 slanted towards the center. The oppositely slanted outer and underside portion of the projection forms, at its outer edge, a drip edge 14'.

The outside 18 of lid 12, in about the middle thereof, is provided with a protruding bulge 18'. Appropriately, the drip edge 14' of the projection 13 is in line with the outside of bulge 18'. Two threaded sack holes 19 are provided on the inside 17 of lid 12, by means of which screws or other suitable fasteners a small support 20 is fastened to the inside of the lid. The support 20 is provided with two inwardly facing lobes 20' at a distance from each other, each provided with an upwardly positioned, elongated hole 21.

The small support 20 serves for the attachment of an adjusting device operative from the inside of the vehicle by means of which the lid 12 may be swung by a desired amount to open or close the openings 9. Into the upwardly extending wall of extension 10, at about the elevation of the center of opening 9, a sleeve-like spindle nut 22 is rotatably inserted. At the end of the spindle nut facing the passenger compartment, a hand wheel 23 is securely attached for effecting rotation of the spindle nut. The spindle nut 22 at the outside of the upwardly extending trench wall is secured against longitudinal movement by securing means 22'.

By rotating the hand wheel 23, a spindle bolt 24, which is non-rotatably arranged in the nut 22, is moved longitudinally toward and away from opening 9. Its flatly set off end 24' engages with the space between the two lugs 20' of the small support 20 and is connected therewith by pin 25 engaging with the elongated holes 21. The ends of the pin 25 slide in slot 21 with a longitudinal movement of the spindle released through rotation of the hand wheel 23 because the lid 12 pivots positively outwardly about the axis of the cylindrically shaped bead 16. Thereby, the opening 9 is uncovered to allow fresh air access from the outside.

Naturally, lid 12 may also be pivotably arranged at the inside of the insert member 5, and the arrangement of the pivot axis is also possible on its lower edge rather than its upper edge. Lid 12 may also include a pivot support about an axis arranged ahead or behind the center of opening 9 in a longitudinal direction for simultaneously opening or covering of each half opening toward each side. In such cases, as is known, the pressure differential existing at both opening sides may be utilized to draw off used inside air. Finally, the lid may also be arranged transversely to the opening whereby at all cross sections except at both ends, the advantages mentioned above may be realized.

It may be appropriate or advantageous to let the outside air enter additionally through openings arranged at the window posts 3' or at the upwardly extending insert members arranged between the posts. By providing lids alternately at one or more insert members, a portion may be used with corresponding opening position for the supply of fresh air and the other portion in opposite position for venting of the used air. Furthermore, the possibility exists to manufacture the insert members and the lids as well as possibly also the components of the adjusting mechanism from a transparent material, for example, Plexiglas, so that the ventilating arrangement does not hinder normal vision through said window.

While I have shown and described one embodiment in accordance with the present invention, it is understood that the same is not limited thereto but is susceptible of numerous changes and modifications as known to a person skilled in the art; and I, therefore, do not wish to be limited to the details shown and described herein but intend to cover all such changes and modifications as are encompassed by the scope of the appended claims.

I claim:

1. Ventilating arrangement for vehicles, particularly buses, provided with seating spaces for accommodating passengers, windows adjacent said seating spaces and frame members supporting said windows in the vehicle superstructure, comprising:
   insert means provided between one edge of a vehicle window and a frame member extending over the entire width of said window,
   sealing means for sealing said insert means along the entire periphery thereof to said window and said frame member, and
   selectively closeable aperture means in said insert means manually adjustable from within said vehicle for regulating the degree of opening of said aperture means,
   said aperture means further including a pivotable closure member associated with each opening and capable of being adjusted as to position with respect to said opening from within the vehicle,
   said insert means including an extension forming an open channel on the inside of the vehicle in proximity to said one edge of said window, and adjusting means mounted on said extension for controlling actuation of said pivotable closure member.

2. Ventilating arrangement for vehicles, particularly buses, provided with seating spaces for accommodating passengers, windows adjacent said seating spaces and frame members supporting said windows in the vehicle superstructure, comprising:
   insert means provided between one edge of a vehicle window and a frame member extending over the entire width of said window,
   sealing means for sealing said insert means along the entire periphery thereof to said window and said frame member, and
   selectively closeable aperture means in said insert means manually adjustable from within said vehicle for regulating the degree of opening of said aperture means,
   said aperture means further including a pivotable closure member associated with each opening and capable of being adjusted as to position with respect to said opening from within the vehicle,
   said insert means including an extension forming an open channel on the inside of the vehicle in proximity to said one edge of said window, and adjusting means mounted on said extension for controlling actuation of said pivotable closure member,
   said channel formed by said extension having its bottom surface in substantial alignment with the bottom edge of said opening and being inclined slightly downwardly toward the vehicle exterior.

3. In a ventilating arrangement for vehicles, particularly buses, provided with a plurality of adjustable windows along the lateral sides of the vehicle superstructure adjacent the passenger seating spaces, the improvement essentially consisting of
   portable insert means supported between one edge of each vehicle window and the associated vehicle superstructure including apertures in said insert means adjacent each passenger seating space and pivotable closure means associated with each aperture,
   sealing means for sealing said insert means in each window space, and
   adjusting means provided for each closure means for selectively individually adjusting the degree of opening of each aperture,
   said adjusting means including rotary spindle means articulated to said closure means and handle means for operating said spindle means,
   channel means formed on said insert means adjacent said window along one edge thereof for supporting said adjusting means and collecting condensation from said window.

4. Ventilating arrangement for vehicles, particularly buses, provided with seating spaces for accommodating passengers, windows adjacent said seating spaces and frame members supporting said windows in the vehicle superstructure, comprising:
   insert means provided between one edge of a vehicle window and a frame member extending over the entire width of said window,
   sealing means for sealing said insert means along the entire periphery thereof to said window and said frame member, and
   selectively closeable aperture means in said insert means manually adjustable from within said vehicle for regulating the degree of opening of said aperture means,
   said aperture means further including a pivotable closure member associated with each opening and capable of being adjusted as to position with respect to said opening from within the vehicle,
   said insert means including an extension forming an open channel on the inside of the vehicle in proximity to said one edge of said window, and adjustings means mounted on said extension for controlling actuation of said pivotable closure member,
   said adjusting means comprising a spindle nut rotatably mounted on said extension, a hand wheel secured to said spindle nut for effecting rotation thereof, and a spindle bolt threadably engaged in said spindle nut at one end thereof and non-rotatably articulated to said closure member at the other end thereof.

5. Ventilating arrangement for vehicles, particularly buses, provided with seating spaces for accommodating passengers, windows adjacent said seating spaces and frame members supporting said windows in the vehicle superstructure, comprising:
   insert means provided between one edge of a vehicle window and a frame member extending over the entire width of said window,
   sealing means for sealing said insert means along the entire periphery thereof to said window and said frame member, and
   selectively closeable aperture means in said insert means manually adjustable from within said vehicle for regulating the degree of opening of said aperture means,
   said aperture means further including a pivotable closure member associated with each opening and capable of being adjusted as to position with respect to said opening from within the vehicle,
   said insert means including an extension forming an open channel on the inside of the vehicle in proximity to said one edge of said window, and adjusting means mounted on said extension for controlling actuation of said pivotable closure member,
   said adjusting means comprising a spindle nut rotatably mounted on said extension, a hand wheel secured to said spindle nut for effecting rotation thereof, and a spindle bolt threadably engaged in said spindle nut at one end thereof and non-rotatably articulated to said closure member at the other end thereof, a support bracket fastened to said closure member on the inner surface thereof and having a pair of spaced lugs for accommodating said spindle bolt.

6. Ventilating arrangement for vehicles, particularly buses, provided with seating spaces for accommodating passengers, windows adjacent said seating spaces and frame members supporting said windows in the vehicle superstructure, comprising:

insert means provided between one edge of a vehicle window and a frame member extending over the entire width of said window, sealing means for sealing said insert means along the entire periphery thereof to said window and said frame member, and selectively closeable aperture means in said insert means manually adjustable from within said vehicle for regulating the degree of opening of said aperture means, said aperture means further including a pivotable closure member associated with each opening and capable of being adjusted as to position with respect to said opening from within the vehicle, said insert means including an extension forming an open channel on the inside of the vehicle in proximity to said one edge of said window, and adjusting means mounted on said extension for controlling actuating of said pivotable closure member, said adjusting means comprising a spindle nut rotatably mounted on said extension, a hand wheel secured to said spindle nut for effecting rotation thereof, and a spindle bolt threadably engaged in said spindle nut at one end thereof and non-rotatably articulated to said closure member at the other end thereof, a support bracket fastened to said closure member on the inner surface thereof and having a pair of spaced lugs for accommodating said spindle bolt, said spaced lugs each being provided with an elongated aperture, and pin means arranged on said other end of said spindle bolt for engagement in the elongated aperture of said lugs to provide said non-rotatable articulation.

7. In a ventilating arrangement for vehicles, particularly buses, provided with a plurality of adjustable windows along the lateral sides of the vehicle superstructure adjacent the passenger seating spaces, the improvement essentially consisting of removable insert means sealed in each window space providing aperture means in the form of at least one air inlet aperture in registration with each passenger seating space, means for selectively individually regulating the degree of opening of said aperture means, and channel means formed on said insert means adjacent said window for supporting said regulating means, said channel means extending inwardly toward the interior of the vehicle and having an upwardly extending portion forming a water collecting channel with a base portion secured to said insert means along the lowest edge of said air inlet aperture.

References Cited by the Examiner

UNITED STATES PATENTS

| | | | |
|---|---|---|---|
| 1,518,715 | 12/1924 | Walker | 98—2.2 |
| 1,750,178 | 3/1930 | Macleod | 98—2.2 |
| 1,912,281 | 6/1933 | Kraft | 98—2.2 |

FOREIGN PATENTS

| | | |
|---|---|---|
| 634,958 | 1/1962 | Canada. |
| 828,857 | 2/1960 | Great Britain. |

MEYER PERLIN, *Primary Examiner.*